(12) United States Patent
Veinotte

(10) Patent No.: US 7,011,077 B2
(45) Date of Patent: Mar. 14, 2006

(54) FUEL SYSTEM AND METHOD FOR MANAGING FUEL VAPOR PRESSURE WITH A FLOW-THROUGH DIAPHRAGM

(75) Inventor: Andre Veinotte, Dresden (CA)

(73) Assignee: Siemens VDO Automotive, Inc., Chatham (CA)

( * ) Notice: Subject to any disclaimer, the term of this patent is extended or adjusted under 35 U.S.C. 154(b) by 213 days.

(21) Appl. No.: 10/794,047

(22) Filed: Mar. 8, 2004

(65) Prior Publication Data

US 2004/0226545 A1 Nov. 18, 2004

Related U.S. Application Data

(60) Provisional application No. 60/453,021, filed on Mar. 7, 2003.

(51) Int. Cl.
*F02M 25/08* (2006.01)

(52) U.S. Cl. .................. 123/520; 123/516; 123/518; 123/198 D; 73/118.1; 73/49.2; 73/49.7; 137/493.9; 137/852; 137/859

(58) Field of Classification Search .............. 123/516, 123/518–520, 198 D; 137/102, 493.1, 493.8, 137/493.9, 554, 844, 845, 852, 859; 73/118.1, 73/40, 49.2, 49.7; 277/391
See application file for complete search history.

(56) References Cited

U.S. PATENT DOCUMENTS

| 322,084 | A | 7/1885 | Wilder |
| 2,111,813 | A | 3/1938 | Schroeder |
| 2,204,706 | A | 6/1940 | Searle |
| 2,318,962 | A | 5/1943 | Parker |
| 2,679,946 | A | 6/1954 | Friend |
| 3,007,526 | A | 11/1961 | Nelson |

(Continued)

FOREIGN PATENT DOCUMENTS

| WO | WO-91/12406 | 8/1991 |
| WO | WO-01/38716 | 5/2001 |

OTHER PUBLICATIONS

U.S. Appl. No. 10/758,273, filed Jan. 16, 2004, Veinotte et al., Flow Sensor for Purge Valve Diagnostic.
U.S. Appl. No. 10/758,272, filed Jan. 16, 2004, Veinotte et al., Flow Sensor for Purge Valve Diagnostic.
U.S. Appl. No. 10/758,239, filed Jan. 16, 2004, Veinotte, Flow Sensor Integrated with Leak Detection for Purge Valve Diagnostic.
U.S. Appl. No. 10/758,238, filed Jan. 16, 2004, Veinotte, Flow Sensor Integrated with Leak Detection for Purge Valve Diagnostic.
U.S. Appl. No. 10/736,773, filed Dec. 17, 2003, Perry et al., Apparatus, System and Method of Establishing a Test Threshold for a Fuel Vapor Leak Detection System.

(Continued)

*Primary Examiner*—Weilun Lo

(57) ABSTRACT

A fuel system and a method of method of managing fuel vapor pressure in the fuel system. The fuel system a fuel tank having a headspace, a fuel vapor collection canister in fluid communication with the headspace, a purge valve, and a fuel vapor pressure management apparatus. The method includes performing leak detection on the headspace, and preventing a flow of fluid through an elastic diaphragm during leak detection. The elastic diaphragm includes at least one opening through which passes the flow of fluid. And the preventing the flow of fluid includes a first portion of the elastic diaphragm sealingly engaging a second portion of the elastic diaphragm. The method further includes relieving excess negative pressure in the headspace and relieving excess positive pressure in the headspace by fluid flow in different directions along the same flow path that includes the opening in the diaphragm.

15 Claims, 3 Drawing Sheets

U.S. PATENT DOCUMENTS

| | | | |
|---|---|---|---|
| 3,084,707 A | * | 4/1963 | Frye .......................... 137/102 |
| 3,159,176 A | * | 12/1964 | Russell et al. ........... 137/493.1 |
| 3,413,840 A | | 12/1968 | Basile et al. |
| 3,741,232 A | | 6/1973 | Soberski |
| 3,749,127 A | | 7/1973 | Becken et al. |
| 3,941,149 A | * | 3/1976 | Mittleman ............... 137/493.1 |
| 4,368,366 A | | 1/1983 | Kitamura et al. |
| 4,819,607 A | | 4/1989 | Aubel |
| 4,842,015 A | | 6/1989 | Haak et al. |
| 4,926,825 A | | 5/1990 | Ohtaka et al. |
| 4,949,695 A | | 8/1990 | Uranishi et al. |
| 4,951,701 A | | 8/1990 | Boehmer |
| 4,962,744 A | | 10/1990 | Uranishi et al. |
| 5,021,071 A | | 6/1991 | Reddy |
| 5,036,823 A | | 8/1991 | MacKinnon |
| 5,088,466 A | | 2/1992 | Tada |
| 5,103,854 A | * | 4/1992 | Bailey et al. ............... 137/102 |
| 5,105,789 A | | 4/1992 | Aramaki et al. |
| 5,113,834 A | | 5/1992 | Aramaki |
| 5,116,257 A | | 5/1992 | Szlaga |
| 5,143,035 A | | 9/1992 | Kayanuma |
| 5,146,902 A | | 9/1992 | Cook et al. |
| 5,150,689 A | | 9/1992 | Yano et al. |
| 5,158,054 A | | 10/1992 | Otsuka |
| 5,169,393 A | | 12/1992 | Moorehead et al. |
| 5,191,870 A | | 3/1993 | Cook |
| 5,203,872 A | | 4/1993 | Naffziger et al. |
| 5,224,511 A | | 7/1993 | Schnettler |
| 5,253,629 A | | 10/1993 | Fornuto et al. |
| 5,263,462 A | | 11/1993 | Reddy |
| 5,295,472 A | | 3/1994 | Otsuka et al. |
| 5,373,822 A | | 12/1994 | Thompson |
| 5,449,018 A | | 9/1995 | Harris |
| 5,474,050 A | | 12/1995 | Cook et al. |
| 5,524,662 A | | 6/1996 | Benjey et al. |
| 5,603,349 A | | 2/1997 | Harris |
| 5,863,025 A | | 1/1999 | Noya |
| 5,911,209 A | | 6/1999 | Kouda et al. |
| 6,058,970 A | * | 5/2000 | Osaki et al. ................ 137/587 |
| 6,105,608 A | | 8/2000 | Katzman |
| 6,289,916 B1 | | 9/2001 | Romanek |
| 6,328,021 B1 | | 12/2001 | Perry et al. |
| 6,450,152 B1 | | 9/2002 | Everingham |
| 6,460,566 B1 | | 10/2002 | Perry et al. |
| 6,478,045 B1 | | 11/2002 | Perry |
| 6,502,560 B1 | * | 1/2003 | Perry ........................ 123/519 |
| 6,564,780 B1 | | 5/2003 | Hanai et al. |
| 6,662,827 B1 | * | 12/2003 | Clougherty et al. ........ 137/859 |
| 6,668,876 B1 | | 12/2003 | Veinotte et al. |
| 6,772,739 B1 | * | 8/2004 | Veinotte et al. ............. 123/516 |
| 2002/0157655 A1 | | 10/2002 | Streib |
| 2003/0024510 A1 | | 2/2003 | Veinotte et al. |
| 2003/0029425 A1 | | 2/2003 | Veinotte et al. |
| 2003/0034015 A1 | | 2/2003 | Veinotte et al. |
| 2003/0037772 A1 | | 2/2003 | Veinotte et al. |
| 2003/0056771 A1 | | 3/2003 | Veinotte et al. |
| 2003/0070473 A1 | | 4/2003 | Veinotte et al. |

OTHER PUBLICATIONS

U.S. Appl. No. 10/667,965, filed Sep. 23, 2003, Veinotte, Method of Designing a Fuel Vapor Pressure Management Apparatus.

U.S. Appl. No. 10/667,963, filed Sep. 23, 2003, Veinotte et al., Apparatus and Method of Changing Printed Circuit Boards in a Fuel Vapor Pressure Management.

U.S. Appl. No. 10/667,903, filed Sep. 23, 2003, Veinotte et al., Rationality Testing for a Fuel Vapor Pressure Management Apparatus.

U.S. Appl. No. 10/667,902, filed Sep. 23, 2003, Perry et al., In–Use Rate Based Calculation for a Fuel Vapor Pressure Management Apparatus.

U.S. Appl. No. 10/171,473, filed Jun. 14, 2002, Veinotte, Method for Fuel Vapor Pressure Management.

U.S. Appl. No. 10/171,472, filed Jun. 14, 2002, Veinotte et al., A Poppet for a Fuel Vapor Pressure Management Apparatus.

U.S. Appl. No. 10/171,471, filed Jun. 14, 2002, Veinotte, Method of Designing a Fuel Vapor Pressure Management Apparatus.

U.S. Appl. No. 10/171,469, filed Jun. 14, 2992, Veinotte et al., Bi–directional Flow Seal for a Fuel Vapor Pressure in a Fuel System.

U.S. Appl. No. 10/170,397, filed Jun. 14, 2002, Veinotte, Fuel System Including an Apparatus for Fuel Vapor Pressure Management Apparatus.

U.S. Appl. No. 10/170,420, filed Jun. 14, 2002, Veinotte, Apparatus and Method for Preventing Resonance in a Fuel Vapor Pressure Management Apparatus.

Siemens document—OBDII Systems and Components (16 pages) Aug. 28, 1992.

Siemens document—Proposal for Pressure Testing and Evaporative System (OBDII) (18 pages) May 11, 1992.

* cited by examiner

FUEL SYSTEM AND METHOD FOR MANAGING FUEL VAPOR PRESSURE WITH A FLOW-THROUGH DIAPHRAGM

CROSS REFERENCE TO RELATED APPLICATIONS

This application claims the benefit of the earlier filing date of U.S. Provisional Application No. 60/453,021, filed 7 Mar. 2003, which is incorporated by reference herein in its entirety.

Related co-pending U.S. Utility Application No. 10/794,083, titled "Flow-Through Diaphragm for a Fuel Vapor Pressure Management Apparatus," filed concurrently herewith, is incorporated by reference herein in its entirety.

FIELD OF THE INVENTION

A fuel system and a method of detecting leaks and managing pressure in the fuel system that includes a fuel vapor pressure management apparatus. In particular, a volatile fuel system and a method of detecting leaks and managing pressure including a fuel vapor pressure management apparatus that uses naturally forming vacuum to perform a leak diagnostic for a headspace in a fuel tank, a canister that collects volatile fuel vapors from the headspace, a purge valve, and the associated pipes, conduits, hoses, and connections.

BACKGROUND OF THE INVENTION

Conventional fuel systems for vehicles with internal combustion engines can include a canister that accumulates fuel vapor from a headspace of a fuel tank. If there is a leak in the fuel tank, the canister, or any other component of the fuel system, fuel vapor could escape through the leak and be released into the atmosphere instead of being accumulated in the canister. Various government regulatory agencies, e.g., the California Air Resources Board, have promulgated standards related to limiting fuel vapor releases into the atmosphere. Thus, it is believed that there is a need to avoid releasing fuel vapors into the atmosphere, and to provide an apparatus and a method for performing a leak diagnostic, so as to comply with these standards.

In such conventional fuel systems, excess fuel vapor can accumulate immediately after engine shutdown, thereby creating a positive pressure in the fuel vapor pressure management system. Excess negative pressure in closed fuel systems can occur under some operating and atmospheric conditions, thereby causing stress on components of these fuel systems. Thus, it is believed that there is a need to vent, or "blow-off," the positive pressure, and to vent, or "relieve," the excess negative pressure. Similarly, it is also believed to be desirable to relieve excess positive pressure that can occur during tank refueling. Thus, it is believed that there is a need to allow air, but not fuel vapor, to exit the tank at high flow rates during tank refueling. This is commonly referred to as onboard refueling vapor recovery (ORVR).

SUMMARY OF THE INVENTION

The present invention provides a fuel system for supplying fuel to an internal combustion engine. The fuel system includes a fuel tank having a headspace, an intake manifold of the internal combustion engine in fluid communication with the headspace, a fuel vapor collection canister in fluid communication with the headspace, a purge valve, and a fuel vapor pressure management apparatus. The purge valve has a first side in fluid communication with the intake manifold and has a second side in fluid communication both with the fuel vapor collection canister and with the headspace. The fuel vapor pressure management apparatus includes a housing, a pressure operable device, and a switch. The housing is coupled to the fuel vapor collection canister and defines an interior chamber. The pressure operable device includes a diaphragm that separates the interior chamber into a first portion in fluid communication with the fuel vapor collection canister and a second portion in fluid communication with a vent port. The diaphragm includes a central portion that is movable along an axis, a peripheral portion that is fixed with respect to the housing, and an intermediate portion that couples the central and peripheral portions. A first arrangement of the pressure operable device occurs when there is a first negative pressure level in the fuel vapor collection canister relative to the vent port and the diaphragm is in a nearly undeformed configuration. A second arrangement of the pressure operable device permits a first fluid flow from the vent port to the fuel vapor collection canister when the diaphragm is in a first deformed configuration. And a third arrangement of the pressure operable device permits a second fluid flow from the fuel vapor collection canister to the vent port when the diaphragm is in a second deformed configuration. The switch signals the first arrangement of the pressure operable device.

The present invention also provides a method of managing pressure in a fuel system that supplies fuel to an internal combustion engine. The fuel system includes a fuel tank that partially defines a headspace. The method includes connecting in fluid communication a fuel vapor collection canister to the headspace, connecting in fluid communication a fuel vapor pressure management apparatus to the fuel vapor collection canister, establishing a fluid flow path, relieving with the fuel vapor pressure management apparatus excess negative pressure in the fuel vapor collection canister, and relieving with the fuel vapor pressure management apparatus excess positive pressure in the fuel vapor collection canister. The fuel vapor pressure management apparatus, which performs leak detection on the headspace, includes a housing and a diaphragm. The housing is coupled to the fuel vapor collection canister and defines an interior chamber. The diaphragm divides the interior chamber into a first portion that is in fluid communication with the fuel vapor collection canister and a second portion that is in fluid communication with a vent port. The fluid flow path that is established extends between the fuel vapor collection canister and the vent port, and includes passing through the first portion of the interior chamber, passing through a plurality of apertures penetrating the diaphragm, and passing through the second portion of the interior chamber. The relieving excess negative pressure is via fluid flow in a first direction along the fluid flow path, and the relieving excess positive pressure is via fluid flow in a second direction along the fluid flow path. The second direction is opposite to the first direction.

The present invention further provides a method of managing fuel vapor pressure in a fuel system that supplies fuel to an internal combustion engine. The fuel system includes a headspace. The method includes performing leak detection on the headspace of the fuel system, and preventing a flow of fluid through an elastic diaphragm during the performing leak detection. The elastic diaphragm includes at least one opening through which passes the flow of fluid. And the preventing the flow of fluid includes a first portion of the elastic diaphragm sealingly engaging a second portion of the elastic diaphragm.

BRIEF DESCRIPTION OF THE DRAWINGS

The accompanying drawings, which are incorporated herein and constitute part of this specification, illustrate presently preferred embodiments of the invention, and, together with the general description given above and the detailed description given below, serve to explain features of the invention.

DETAILED DESCRIPTION OF THE PREFERRED EMBODIMENT

As it is used in this description, "atmosphere" generally refers to the gaseous envelope surrounding the Earth, and "atmospheric" generally refers to a characteristic of this envelope.

As it is used in this description, "pressure" is measured relative to the atmospheric pressure. Thus, positive pressure refers to pressure greater than the atmospheric pressure and negative pressure, or "vacuum," refers to pressure less than the atmospheric pressure.

Also, as it is used in this description, "headspace" refers to the variable volume within an enclosure, e.g. a fuel tank, that is above the surface of the liquid, e.g., fuel, in the enclosure. In the case of a fuel tank for volatile fuels, e.g., gasoline, vapors from the volatile fuel may be present in the headspace of the fuel tank.

Figure 1:
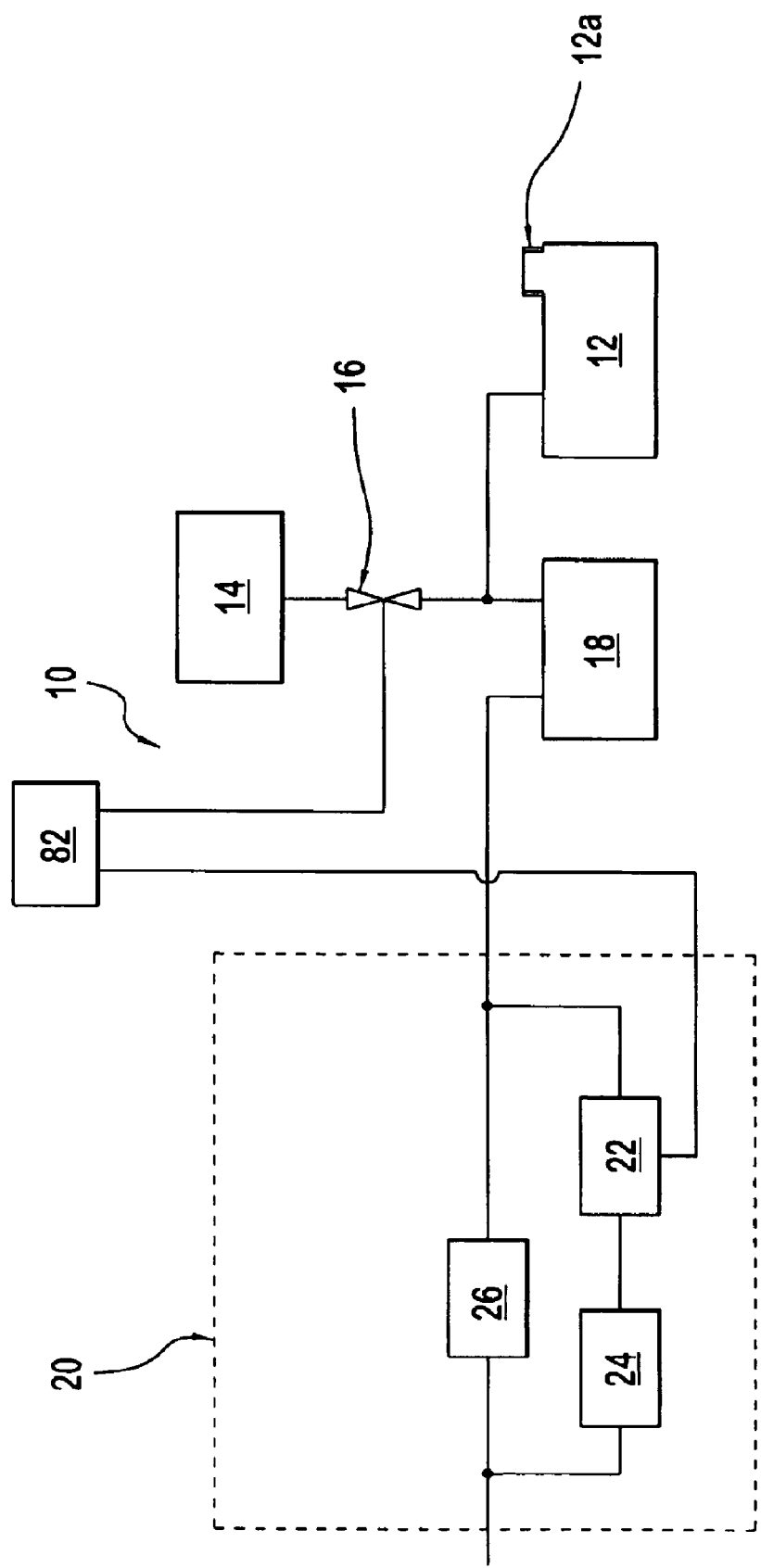
FIG. 1 is a schematic illustration of a fuel system that includes a fuel vapor pressure management apparatus in accordance with the detailed description of the preferred embodiment.

Referring to FIG. 1, a fuel system 10, e.g., for an engine (not shown), includes a fuel tank 12, a vacuum source 14 such as an intake manifold of the engine, a purge valve 16, a fuel vapor collection canister 18, e.g., a charcoal canister, and a fuel vapor pressure management apparatus 20.

The fuel vapor pressure management apparatus 20 performs a plurality of functions that include signaling 22 that a first predetermined pressure (vacuum) level exists (see FIG. 2), "vacuum relief" or relieving negative pressure 24 below the first predetermined pressure level (see FIG. 3), and "pressure blow-off" or relieving positive pressure 26 above a second pressure level (see FIG. 4).

It is understood that volatile liquid fuels, e.g., gasoline, can evaporate under certain conditions, e.g., rising atmospheric temperature, thereby generating fuel vapor. In the course of cooling that is experienced by the fuel system 10, e.g., after the engine is turned off, a vacuum is naturally created by cooling the fuel vapor and air, such as in the headspace of the fuel tank 12 and in the fuel vapor collection canister 18. According to the present description, the existence of a vacuum at the first predetermined pressure level indicates that the integrity of the fuel system 10 is satisfactory. Thus, signaling 22 is used to indicate that there are no appreciable leaks of the fuel system 10. Subsequently, the vacuum relief 24 at a pressure level below the first predetermined pressure level protects the fuel tank 12, e.g., can prevent structural distortion as a result of stress caused by vacuum in the fuel system 10.

The pressure blow-off 26 allows venting of excess pressure, which may be due to fuel evaporation that can occur after the engine is turned-off, and thereby expedite the occurrence of vacuum generation that subsequently occurs during cooling. The pressure blow-off 26 allows air within the fuel system 10 to be released while fuel vapor is retained in the fuel vapor collection canister 18. Similarly, in the course of refueling the fuel tank 12, the pressure blow-off 26 allows air to exit the fuel tank 12 at a high rate of flow.

At least three advantages are achieved in accordance with a system including the fuel vapor pressure management apparatus 20. First, a leak detection diagnostic can be performed on fuel tanks of all sizes. This advantage is significant in that many previous systems for detecting leaks were not effective with known large volume fuel tanks, e.g., 100 gallons or more. Second, the fuel vapor pressure management apparatus 20 is compatible with a number of different types of the purge valves, including digital and proportional purge valves. And third, the fuel vapor pressure management apparatus 20 occupies a small volume, e.g., no more than 240 cubic centimeters. This advantage is significant in that many previous systems for detecting leaks were large and difficult to position in the confined spaces that are available under a vehicle's hood and body.

Figure 2:
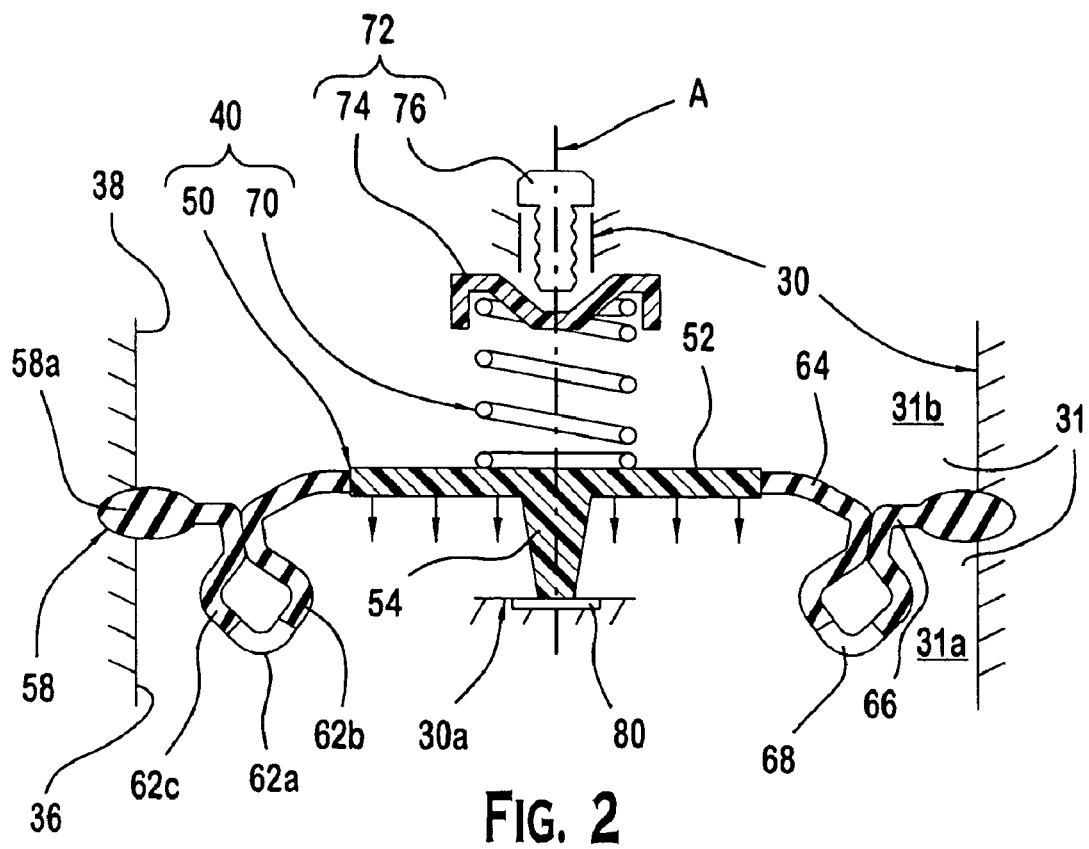
FIG. 2 is a schematic illustration of the fuel vapor pressure management apparatus illustrated in FIG. 1. The fuel vapor pressure management apparatus is in an arrangement for performing leak detection.
Figure 3:
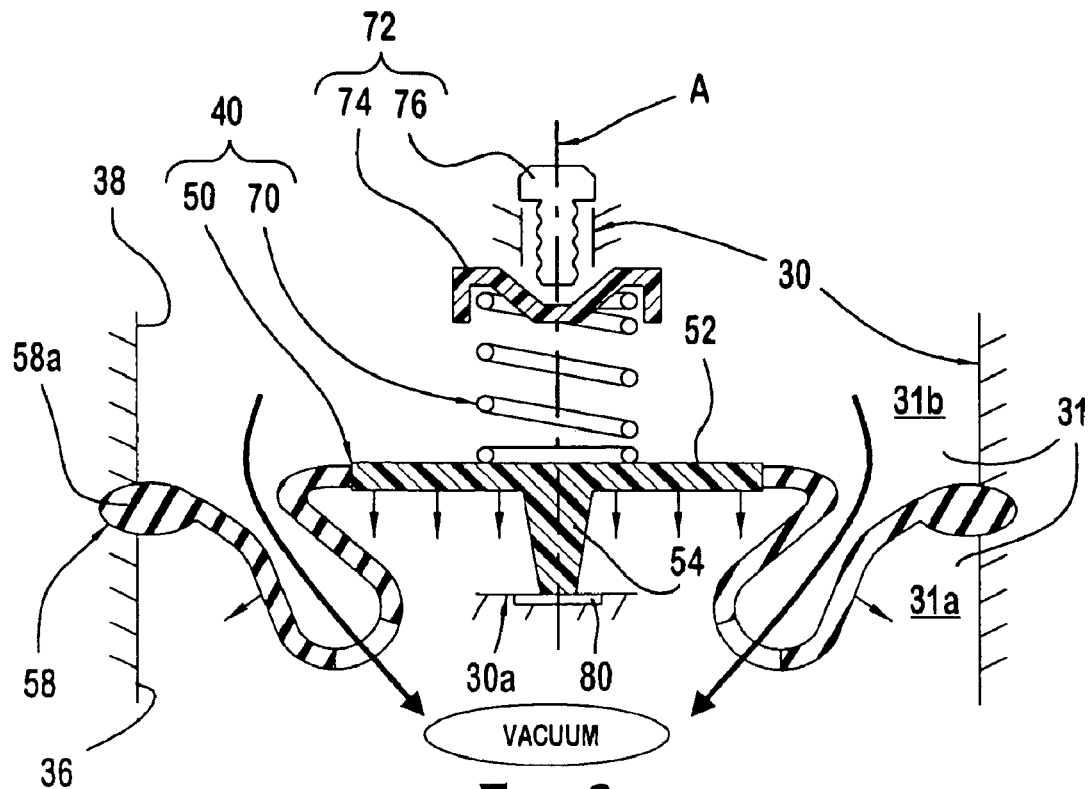
FIG. 3 is a schematic illustration of the fuel vapor pressure management apparatus illustrated in FIG. 1. The fuel vapor pressure management apparatus is in an arrangement for relieving excess negative pressure.
Figure 4:
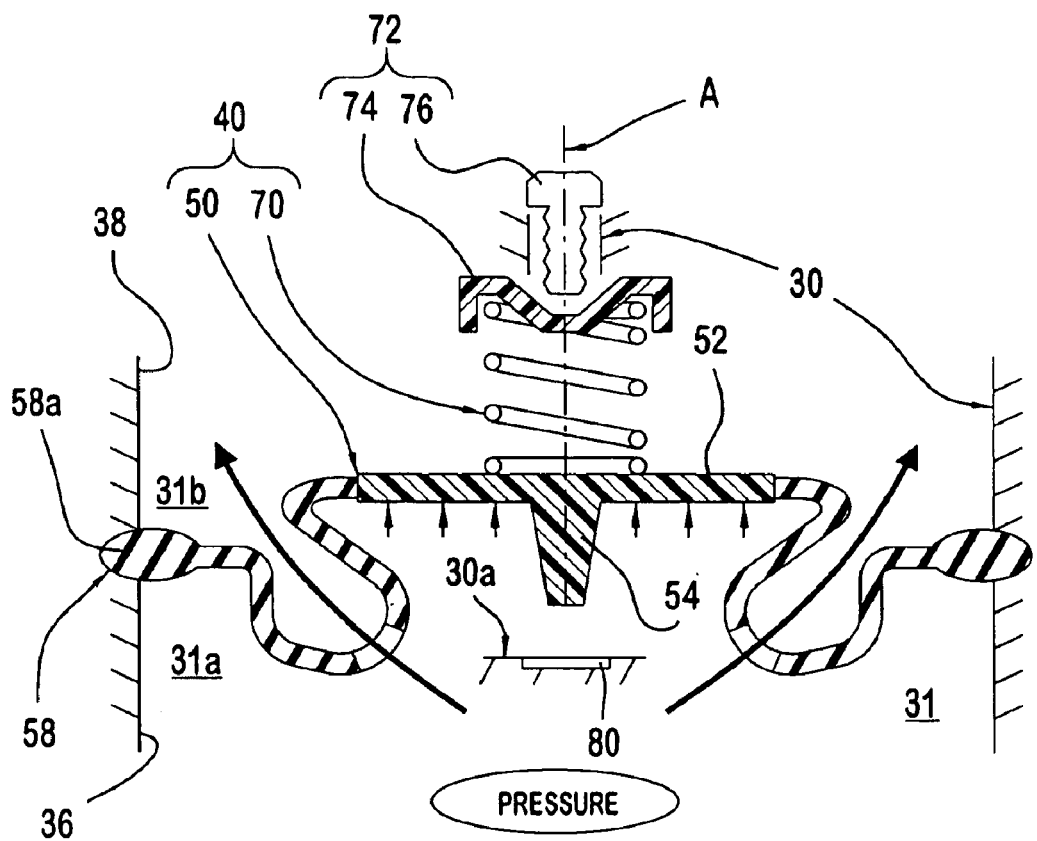
FIG. 4 is a schematic illustration of the fuel vapor pressure management apparatus illustrated in FIG. 1. The fuel vapor pressure management apparatus is in an arrangement for blowing-off positive pressure.

Referring to FIGS. 2–4, a preferred embodiment of the fuel vapor pressure management apparatus 20 includes a housing 30 that can be directly mounted to the body of the fuel vapor collection canister 18, such as by a bayonet style connection. Of course, there can be different styles of connection between the fuel vapor pressure management apparatus 20 and the body of the fuel vapor collection canister 18. Examples of different attachments include a threaded attachment, and an interlocking telescopic attachment. Alternatively, the fuel vapor collection canister 18 and the housing 30 can be bonded together (e.g., using an adhesive), or the body of the fuel vapor collection canister 18 and the housing 30 can be interconnected via an intermediate member such as a rigid pipe or a flexible hose.

The housing 30 defines an interior chamber 31 and includes a first port 36 and a second port 38. The first port 36 provides fluid communication between the fuel vapor collection canister 18 and the interior chamber 31. The second port 38 provides fluid communication, e.g., venting, between the interior chamber 31 and the atmosphere. A filter (not shown) can be interposed between the second port 38 and the atmosphere for reducing contaminants that could be drawn into the fuel vapor pressure management apparatus 20 during the vacuum relief 24 or during operation of the purge valve 16.

In general, it is desirable to minimize the number of pieces required to construct the housing 30 so as to reduce the number of potential leak points, e.g., between housing pieces, which must be sealed.

An advantage of the fuel vapor pressure management apparatus 20 is its compact size. The volume occupied by the fuel vapor pressure management apparatus 20, including the interior chamber 31, is less than many other known leak detection devices, which generally occupy more than 240 cubic centimeters. That is to say, the fuel vapor pressure management apparatus 20, from the first port 36 to the second port 38 and including the interior chamber 31, occupies less than 240 cubic centimeters. In particular, the fuel vapor pressure management apparatus 20 occupies a volume of less than 100 cubic centimeters. This size reduction over many known leak detection devices is significant given the limited availability of space in contemporary automobiles.

A pressure operable device 40 can separate the interior chamber 31 into a first portion 31a and a second portion 31b. The first portion 31a is in fluid communication with the fuel vapor collection canister 18 through the first port 36, and the second portion 31b is in fluid communication with the atmosphere through the second port 38.

The pressure operable device 40 includes a diaphragm 50 and a resilient element 70. During the signaling 22, the diaphragm 50 prevents fluid communication between the first and second ports 36,38 (FIG. 2). During the vacuum relief 24, the diaphragm 50 permits fluid flow from the second port 38 to the first port 36 (FIG. 3). During the pressure blow-off 26, the diaphragm 50 permits fluid flow from the first port 36 to the second port 38 (FIG. 4).

The pressure operable device 40, with its different arrangements of the diaphragm 50, may be considered to constitute a bi-directional check valve. That is to say, under a first set of conditions, the pressure operable device 40 permits fluid flow along a path in one direction, e.g., from the second port 38 to the first port 36, and under a second set of conditions, the same pressure operable device 40 permits fluid flow along the same path in the opposite direction, e.g., from the first port 36 to the second port 38.

Operation of the pressure operable device 40 is dependent on a pressure differential between the first and second ports 36,38. Preferably, all operations of the pressure operable device 40 are controlled by fluid pressure signals that act on one side, e.g., the first port 36 side, of the pressure operable device 40.

Figure 5:
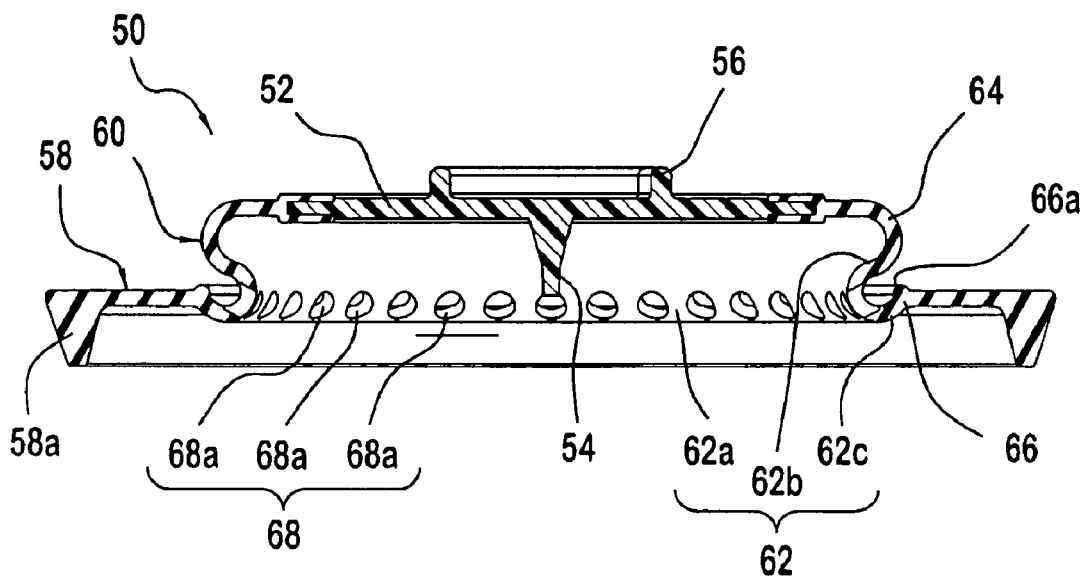
FIG. 5 is a detail view of the diaphragm of the fuel vapor pressure management apparatus in accordance with the detailed description of the preferred embodiment.

With additional reference to FIG. 5, the diaphragm 50 includes a central portion 52 movable along an axis A, a peripheral portion 58 fixed with respect to the housing 30, and an intermediate portion 60 coupling the central and peripheral portions 52,58.

The central portion 52 may be made of any metal (e.g., aluminum), polymer (e.g., nylon), or other material or combination of materials that is impervious to fuel vapor, is low density, is substantially rigid. The central portion 52 may also include a projection 54 and a seat 56. The projection 54 performs several functions, including cooperating with a portion of the housing 30a to limit movement of the diaphragm 50 along the axis A. The seat 56 may cooperatively engage the resilient element 70.

The peripheral portion 58, which may include an enlarged bead 58a, is secured to the housing 30, and may be secured between and seal two parts of the housing 30.

The intermediate portion 60 of the diaphragm 50 can be made of any material that is sufficiently elastic to permit many cycles of flexing between undeformed and deformed configurations. Preferably, the intermediate portion 60 is molded from rubber or a polymer, e.g., nitrites or fluorosilicones. More preferably, the seal has a stiffness of approximately 50 durometer (Shore A), and is self-lubricating or has an anti-friction coating, e.g., polytetrafluoroethylene. According to an exemplary embodiment, the diaphragm 50 is made of Santoprene 123-40. The diaphragm 50 may be formed by molding the peripheral and intermediate portions 54,56 onto the central portion 52.

The intermediate portion 60 of the diaphragm 50 can include a convolute 62 including a crest portion 62a that couples a first sidewall portion 62b and a second sidewall portion 62c. A first root section 64 couples the first sidewall portion 62b and the central portion 52 of the diaphragm 50. A second root section 66 couples the second sidewall portion 62c and the peripheral portion 58 of the diaphragm 50.

During the signaling 22, the first and second root sections 64,66 sealingly engage one another. According to a preferred embodiment, at least one of the first and second root sections 64,66 may include mating features (a rim 66a is shown in FIG. 5) to enhance the sealing engagement.

An opening 68 penetrates at least one of the crest 62a and the first and second sidewalls 62b,62c, and provides a fluid passage through the diaphragm 50. During the signaling 22, fluid flow through the opening 68 in the diaphragm 50 is blocked by the sealing engagement of the first and second root sections 64,66. However, during the vacuum relief 24 and during the pressure blow-off 26, fluid can flow through the opening 68 and between the disengaged first and second roots sections 64,66.

According to a preferred embodiment, during the vacuum relief 24, vacuum in the fuel vapor collection canister 18 relative to atmospheric pressure causes deformation of the convolute 62 such that the crest 62a is displaced toward the fuel vapor collection canister 18 and the first and second sidewalls 62b,62c are drawn apart from one another. Consequently, a first fluid flow occurs from the second port 38, between the disengaged first and second root sections 64,66, through the opening 68, and to the first port 36. During the pressure blow-off 26, pressure in the fuel vapor collection canister 18 relative to atmospheric pressure causes displacement of the central portion 52 away from the fuel vapor collection canister 18, which in turn deforms the convolute 62 such that the first and second sidewalls 62b,62c are drawn apart from one another. Consequently, a second fluid flow occurs from the first port 36, through the opening 68, between the disengaged first and second root sections 64,66, and to the second port 38.

According to a preferred embodiment, the opening 68 includes a plurality of apertures 68a that are uniformly distributed around the convolute 62.

The resilient element 70 biases the central portion 52 of the diaphragm 50 towards the housing portion 30a. The resilient element 70 can be a compression coil spring that is disposed between the diaphragm 50 and the housing 30. Preferably, such a coil spring is centered about the axis A.

Different embodiments of the resilient element 70 can include more than one coil spring, a leaf spring, or an elastic block. The different embodiments can also include various materials, e.g., metals or polymers. And the resilient element 70 can be disposed differently, e.g., a tension spring disposed between the housing part 30a and the diaphragm 50.

It is also possible to use the weight of the diaphragm 50, in combination with the force of gravity, to urge the diaphragm 50 toward the housing portion 30a. As such, the biasing force supplied by the resilient element 70 could be reduced or eliminated.

The construction of the resilient element 70, in particular the spring rate and length of the resilient member, can be provided so as to set the value of the pressure level at which the vacuum relief 24 occurs. According to a preferred embodiment, a calibrator 72 disposed between the resilient element 70 and the housing 30 can tune the biasing force provided by the resilient element 70. For example, seat 74 receiving the resilient element 70 can be displaced relative to the housing 30 by a threaded adjuster 76.

According to a preferred embodiment of the present invention, the diaphragm 50 and the resilient element 70 are the only operating components for the fuel vapor pressure management apparatus 20. Thus, there are a number of advantages according to the present invention including the associated manufacturing and assembly cost savings resulting from the minimal number of components.

A switch 80 can perform the signaling 22. Preferably, movement of the diaphragm 50 along the axis A actuates the switch 80. The switch 80 can be fixed with respect to the housing portion 30a, and movement of the diaphragm 50 closes or opens an electrical circuit in which the switch 80 is connected. In general, the switch 80 is selected so as to require a minimal actuation force, e.g., 50 grams or less. According to a preferred embodiment of the present invention, the resilient element 70 can apply a preload force to the switch 80.

Different embodiments of the switch 80 can include a dome switch or other contact type switches, a load cell transducer or other type of analog or digital transducers, magnetic proximity switches, piezoelectric contact sensors, or any other type of device capable of signaling that the diaphragm 50 has moved to a prescribed position or that the diaphragm 50 is exerting a prescribed force on the switch 80.

The signaling 22 occurs when vacuum at the first predetermined pressure level is present at the first port 36. During the signaling 22, the first and second root sections 64,66 cooperatively engage one another to prevent fluid communication between the first and second ports 36,38. At the first predetermined pressure level, e.g., a fraction of one inch of water vacuum relative to the atmospheric pressure, displacement of the diaphragm 50 will assume a nearly undeformed configuration, e.g., the diaphragm 50 retains substantially the same shape and all but the peripheral portion 58 may be displaced up to several thousandths of an inch in order to actuate the switch 80, thereby opening or closing an electrical circuit that can be monitored by an electronic control unit 82. As vacuum is released, i.e., the pressure at the first port 36 rises above the first predetermined pressure level, the elasticity of the diaphragm 50 causes the diaphragm 50 to return to its nominal configuration, e.g., unmoved and undeformed by relative pressure differentials between the first and second ports 36,38, thereby releasing the actuating force on the movable contact 84 and resetting the switch 80.

At least four advantages are achieved in accordance with the operations performed by the fuel vapor pressure management apparatus 20. First, providing a leak detection diagnostic using vacuum monitoring during natural cooling, e.g., after the engine is turned off. Second, providing relief for vacuum below the first predetermined pressure level, and providing relief for positive pressure above the second predetermined pressure level. Third, vacuum relief provides fail-safe purging of the canister 18. And fourth, the relieving pressure 26 regulates the pressure in the fuel tank 12 during any situation in which the engine is turned off, thereby limiting the amount of positive pressure in the fuel tank 12 and allowing the cool-down vacuum effect to occur sooner.

It is desirable during leak detection testing of the fuel system 10 that the level at which a leak is detected to be just below the required limit set by the various government regulatory agencies. This maximizes the opportunity to locate, and then repair, a leak of the fuel system 10.

While the present invention has been disclosed with reference to certain preferred embodiments, numerous modifications, alterations, and changes to the described embodiments are possible without departing from the sphere and scope of the present invention, as defined in the appended claims. Accordingly, it is intended that the present invention not be limited to the described embodiments, but that it have the full scope defined by the language of the following claims, and equivalents thereof.

What is claimed is:

1. A fuel system for supplying fuel to an internal combustion engine, the fuel system comprising:
   a fuel tank having a headspace;
   an intake manifold of the internal combustion engine in fluid communication with the headspace;
   a fuel vapor collection canister in fluid communication with the headspace;
   a purge valve having a first side in fluid communication with the intake manifold and having a second side in fluid communication with fuel vapor collection canister and with the headspace; and
   a fuel vapor pressure management apparatus including:
      a housing coupled to the fuel vapor collection canister and defining an interior chamber;
      a pressure operable device including a diaphragm separating the interior chamber into a first portion in fluid communication with the fuel vapor collection canister and a second portion in fluid communication with a vent port, the diaphragm including a central portion movable along an axis, a peripheral portion fixed with respect to the housing, and an intermediate portion coupling the central and peripheral portions, a first arrangement of the pressure operable device occurs when there is a first negative pressure level in the fuel vapor collection canister relative to the vent port and the diaphragm is in a nearly undeformed configuration, the intermediate portion having at least one aperture and sections engaging each other to prevent fluid flow through the at least one aperture, a second arrangement of the pressure operable device permits a first fluid flow from the vent port to the fuel vapor collection canister when the diaphragm is in a first deformed configuration, and a third arrangement of the pressure operable device permits a second fluid flow from the fuel vapor collection canister to the vent port when the diaphragm is in a second deformed configuration; and
      a switch signaling the first arrangement of the pressure operable device.

2. The fuel system according to claim 1, wherein the intermediate portion of the diaphragm comprises:
   a convolute including a crest coupling first and second sidewalls;
   a first root section coupling the first sidewall and the central portion of the diaphragm;
   a second root section coupling the second sidewall and the peripheral portion of the diaphragm, the second root section sealingly engaging the first root section in the nearly undeformed configuration of the diaphragm, and the second root section disengaging the first root section in the first and second deformed configurations of the diaphragm; and
   a plurality of apertures penetrating at least one of the crest and the first and second sidewalls, the first and second fluid flows passing through the apertures in the first and second deformed configurations of the diaphragm.

3. The fuel system according to claim 1, wherein the pressure operable device comprises a resilient element biasing the diaphragm toward the nearly undeformed configuration.

4. The fuel system according to claim 1, further comprising:
   an engine control unit operatively connected to the purge valve, the engine control unit being electrically connected to the switch.

5. The fuel system according to claim 1, further comprising:
   a contiguous connection between the fuel vapor collection canister and the housing.
6. The fuel system according to claim 1, further comprising:
   a remote connection extending between the fuel vapor collection canister and the housing spaced from the fuel vapor collection canister.
7. The fuel system according to claim 6, wherein the remote connection is selected from a group consisting of a rigid pipe and a flexible pipe.
8. A method of managing pressure in a fuel system supplying fuel to an internal combustion engine, the fuel system including a fuel tank partially defining a headspace, the method comprising:
   connecting in fluid communication a fuel vapor collection canister to the headspace;
   connecting in fluid communication a fuel vapor pressure management apparatus to the fuel vapor collection canister, the fuel vapor pressure management apparatus performing leak detection on the headspace, the fuel vapor management apparatus including:
      a housing coupled to the fuel vapor collection canister and defining an interior chamber;
      a diaphragm dividing the interior chamber into a first portion in fluid communication with the fuel vapor collection canister and a second portion in fluid communication with a vent port; and
   establishing a fluid flow path extending between the fuel vapor collection canister and the vent port, the establishing including passing through the first portion of the interior chamber, passing through a plurality of apertures penetrating the diaphragm, and passing through the second portion of the interior chamber;
   relieving with the fuel vapor pressure management apparatus excess negative pressure in the fuel vapor collection canister via fluid flow in a first direction along the fluid flow path; and
   relieving with the fuel vapor pressure management apparatus excess positive pressure in the fuel vapor collection canister via fluid flow in a second direction along the fluid flow path, the second direction being opposite to the first direction; wherein the performing leak detection on the headspace comprises occluding the fluid flow path by having a first portion of the diaphragm sealingly engaging a second portion of the diaphragm.

9. The method according to claim 8, wherein the first and second portions of the diaphragm comprise concentric annuli.

10. A method of managing fuel vapor pressure in a fuel system supplying fuel to an internal combustion engine, the fuel system including a headspace, the method comprising:
   performing leak detection on the headspace of the fuel system; and
   preventing a flow of fluid through an elastic diaphragm during the performing leak detection, the elastic diaphragm including at least one opening through which passes the flow of fluid, and the preventing the flow of fluid including a first portion of the elastic diaphragm sealingly engaging a second portion of the elastic diaphragm.

11. The method according to claim 10, further comprising:
   performing excess negative pressure relief of the headspace, the performing excess negative pressure relief including the flow of fluid passing in a first direction through the at least one opening; and
   deforming the elastic diaphragm in a first deformed configuration during the performing excess negative pressure relief.

12. The method according to claim 11, further comprising:
   performing excess positive pressure relief of the headspace, the performing excess positive pressure relief including the flow of fluid passing in a second direction through the at least one opening, the second direction being opposite the first direction; and
   deforming the elastic diaphragm in a second deformed configuration during the performing excess positive pressure relief.

13. The method according to claim 10, further comprising:
   performing excess positive pressure relief of the headspace, the performing excess positive pressure relief including the flow of fluid passing through the at least one opening; and
   deforming the elastic diaphragm during the performing excess positive pressure relief.

14. The method according to claim 10, wherein the at least one opening comprises a plurality of apertures.

15. The method according to claim 10, wherein the first and second portions of the diaphragm comprise concentric annuli.

* * * * *

UNITED STATES PATENT AND TRADEMARK OFFICE
CERTIFICATE OF CORRECTION

PATENT NO. : 7,011,077 B2 Page 1 of 1
APPLICATION NO. : 10/627003
DATED : March 14, 2006
INVENTOR(S) : Darryl C. Stein It is certified that error appears in the above-identified patent and that said Letters Patent is hereby corrected as shown below:

On the cover page
  Section (75), Inventor, add:
    --M. Shawn Cole, Tolland, CT (US)--.

On the cover page
  Section (73), Assignee,
    delete "Gerber Technology, Inc., Tolland, CT (US)" and insert --Gerber Scientific International, Inc., South Windsor, CT (US)--.

Signed and Sealed this

Fifth Day of September, 2006

JON W. DUDAS
*Director of the United States Patent and Trademark Office*

UNITED STATES PATENT AND TRADEMARK OFFICE
CERTIFICATE OF CORRECTION

PATENT NO. : 7,011,077 B2
APPLICATION NO. : 10/794047
DATED : March 14, 2006
INVENTOR(S) : Andre Veinotte It is certified that error appears in the above-identified patent and that said Letters Patent is hereby corrected as shown below:

This certificate supersedes Certificate of Correction issued September 5, 2006, should be vacated since no Certificate of Correction was granted for this patent number.

Signed and Sealed this

Second Day of January, 2007

JON W. DUDAS
*Director of the United States Patent and Trademark Office*